United States Patent
Wei et al.

(10) Patent No.: US 9,599,097 B2
(45) Date of Patent: Mar. 21, 2017

(54) FLUID POWER GENERATING APPARATUS

(71) Applicant: Chih-Hung Wei, Keelung (TW)

(72) Inventors: Chih-Hung Wei, Keelung (TW); Hao-En Wei, Keelung (TW); Hao-Ting Wei, Keelung (TW); Chi-Che Hsu, Keelung (TW); Rou-An Lai, Keelung (TW); Chih-Ying Huang, Keelung (TW); Pin-Yi Wu, Keelung (TW); Xin-Wen Lai, Keelung (TW); Hui-Yu Chan, Keelung (TW)

(73) Assignee: Chih-Hung Wei, Keelung (TW)

( * ) Notice: Subject to any disclaimer, the term of this patent is extended or adjusted under 35 U.S.C. 154(b) by 516 days.

(21) Appl. No.: 14/196,090

(22) Filed: Mar. 4, 2014

(65) Prior Publication Data

US 2015/0252790 A1 Sep. 10, 2015

(51) Int. Cl.
*F03D 11/02* (2006.01)
*F03D 1/02* (2006.01)
*F03B 17/06* (2006.01)

(52) U.S. Cl.
CPC ............ *F03D 11/02* (2013.01); *F03B 17/061* (2013.01); *F03D 1/025* (2013.01); *F03D 15/00* (2016.05); *F05B 2210/16* (2013.01); *F05B 2260/4031* (2013.01); *F05B 2260/5032* (2013.01); *Y02E 10/28* (2013.01); *Y02E 10/72* (2013.01)

(58) Field of Classification Search
CPC ......... F03D 11/02; F03D 9/002; F03B 17/061
USPC .............................. 290/44, 54, 55
See application file for complete search history.

(56) References Cited

U.S. PATENT DOCUMENTS

| 4,291,233 A | 9/1981 | Kirschbaum | |
|---|---|---|---|
| 2005/0194790 A1* | 9/2005 | Kurachi | H02K 7/183 290/44 |
| 2012/0141249 A1* | 6/2012 | Carlson | F03D 1/04 415/1 |

FOREIGN PATENT DOCUMENTS

| DE | 102008064244 A1 | 6/2010 |
|---|---|---|
| JP | S57180163 U | 11/1982 |
| JP | H11122885 A | 4/1999 |
| JP | H11182405 A | 7/1999 |
| JP | 2001309624 A | 11/2001 |
| JP | 2008063961 A | 3/2008 |
| TW | M367259 U | 10/2009 |
| TW | 201028538 A | 8/2010 |

(Continued)

OTHER PUBLICATIONS

Machine Translation, Yan et al., TW201028538, Aug. 1, 2010.*

(Continued)

*Primary Examiner* — Thomas Truong
(74) *Attorney, Agent, or Firm* — Chun-Ming Shih; HDLS IPR Services

(57) ABSTRACT

A fluid power generating apparatus includes a loading seat, a power generating mechanism, a transmission mechanism and a generator. The power generating mechanism includes a primary shaft, a plurality of driving wheels and a fan. The driving wheels with the fan are connected to the primary shaft and simultaneously rotate. The transmission mechanism includes a driven shaft, a plurality of driven wheels and a hollow body. The rotating direction of the driven shaft and the hollow body is different. The generator includes a primary rotor and a secondary rotor. The primary rotor is connected to the driven shaft. The secondary rotor is connected to the hollow body.

11 Claims, 10 Drawing Sheets

(56) References Cited

FOREIGN PATENT DOCUMENTS

TW          201120313 A     6/2011

OTHER PUBLICATIONS

Office Action dated Sep. 22, 2015 of the corresponding Taiwan patent application.
Office Action dated Oct. 14, 2015 of the corresponding German patent application.
Office Action dated Jan. 12, 2016 of the corresponding Japan patent application.

* cited by examiner

FLUID POWER GENERATING APPARATUS

FIELD OF THE INVENTION

The present invention relates to a fluid power generating apparatus, and more particularly to the fluid power generating apparatus that generates electric power by using wind or hydraulic force.

BACKGROUND OF THE INVENTION

In recent years, issues of environmental protection and increasing depletion of and fossil fuels are brought up to our attention gradually, and one of the solutions to find a way of utilizing natural resources such as wind, hydraulic and solar energies to overcome the aforementioned issues, and natural resources have the advantage of being an inexhaustible resource and thus catch the attention of the academia and industry. For example, a wind power generator generates wind power that is received by a fan and converts mechanical energy generated by the fan into electric power to be outputted; and a hydraulic power generator generates electric power by using hydraulic power instead of wind power, and the wind power generator also has a generator.

In general, the conventional power generator comprises a generator and a fan; and the generator includes a rotating shaft, a rotor and a stator, and the rotor is configured corresponding to the stator, and the fan is fixed to the rotating shaft. When wind blows at the fan, the fan drives the rotating shaft and rotor to rotate together, and the magnetizing effect of the stator and rotor generates electric current to achieve the power generation effect.

However, the convention power generators still have the following drawbacks in actual using practices. Since the generation of electric power simply relies on the rotation of the rotor to drive the fan, the generated power is very little. In addition, when the specification of the fan is expanded to a specific size, the wind speed of the fan must be increased accordingly. Therefore, the generator may falls in an embarrassing situation of being idle due to insufficient wind speed, and the power generation performance of these power generators is low.

In view of the aforementioned drawbacks of the prior art, the inventor of the present invention based on years of experience in the related industry to conduct extensive researches and experiments, and finally designed a feasible solution to overcome the drawbacks of the prior art.

SUMMARY OF THE INVENTION

Therefore, it is a primary objective of the present invention to provide a fluid power generating apparatus that uses a first driving wheel to drive a first driven wheel to rotate, and a second driving wheel to drive a second driven wheel to rotate, so as to achieve the effect of increasing the generating capacity of a generator.

To achieve the aforementioned and other objectives, the present invention provides a fluid power generating apparatus comprising a loading seat, a power generating mechanism, a transmission mechanism and a generator, wherein the power generating mechanism is mounted onto the loading seat, and the power generating mechanism includes a primary shaft, a first driving wheel, a second driving wheel and a fan, and the fan, the first driving wheel and the second driving wheel are sheathed and connected to the primary shaft and rotated synchronously; the transmission mechanism is mounted onto the loading seat and configured corresponding to the power generating mechanism, and the transmission mechanism includes a first transmission assembly and a second transmission assembly, and the first transmission assembly includes a first driven wheel driven by the shaft and fixed to the driven shaft, and the first driven wheel is driven by the first driving wheel to rotate, and the second transmission assembly includes a hollow body sheathed and connected to the driven shaft and a second driven wheel fixed to the hollow body, and the second driven wheel is driven by the second driving wheel to rotate, and the rotating direction of the driven shaft is opposite to the rotating direction of the hollow body; the generator includes a primary rotor and a secondary rotor configured corresponding to the primary rotor, and the primary rotor is connected to the driven shaft and rotated together with the driven shaft, and the secondary rotor is fixed to the hollow body and rotated together with the hollow body.

To achieve the aforementioned and other objectives, the present invention further provides another fluid power generating apparatus comprising a loading seat, a power generating mechanism, a transmission mechanism and a generator, wherein the power generating mechanism is mounted onto the loading seat, and the power generating mechanism includes a primary shaft, a first driving wheel, a second driving wheel, a secondary shaft, a fan and a secondary fan, and the fan and the first driving wheel are sheathed on the primary shaft and rotated synchronously, and the secondary fan and the second driving wheel are sheathed on the secondary shaft and rotated synchronously; the transmission mechanism is mounted onto the loading seat and configured corresponding to the power generating mechanism, and the transmission mechanism includes a first transmission assembly and a second transmission assembly, and the first transmission assembly includes a driven shaft and a first driven wheel fixed to the driven shaft, and the first driven wheel is driven by the first driving wheel to rotate, and the second transmission assembly includes a hollow body sheathed and connected to the driven shaft and a second driven wheel fixed to the hollow body, and the second driven wheel is driven by the second driving wheel to rotate, and the rotating direction of the driven shaft is opposite to the rotating direction of the hollow body; the generator includes a primary rotor and a secondary rotor configured corresponding to the primary rotor, and the primary rotor is fixed to the driven shaft and rotated together with the driven shaft, and the secondary rotor is fixed to the hollow body and rotated together with the hollow body.

The present invention further has the following effects:

1. The design of a magnetic repulsion structure is provided for reducing the rotation torque at the start.

2. The appropriate installation of the first driving wheel and second driving wheel reduces the friction at the initial rotation of the primary shaft and during the rotation process.

The coaxial configuration of the first driven wheel and second driven wheel maintains a well-balanced rotation effect of the driven shaft to reduce the occurrence of imbalance of each rotor, so as to extend the service life of the fluid power generating apparatus.

DESCRIPTION OF THE PREFERRED EMBODIMENTS

Figure 1:
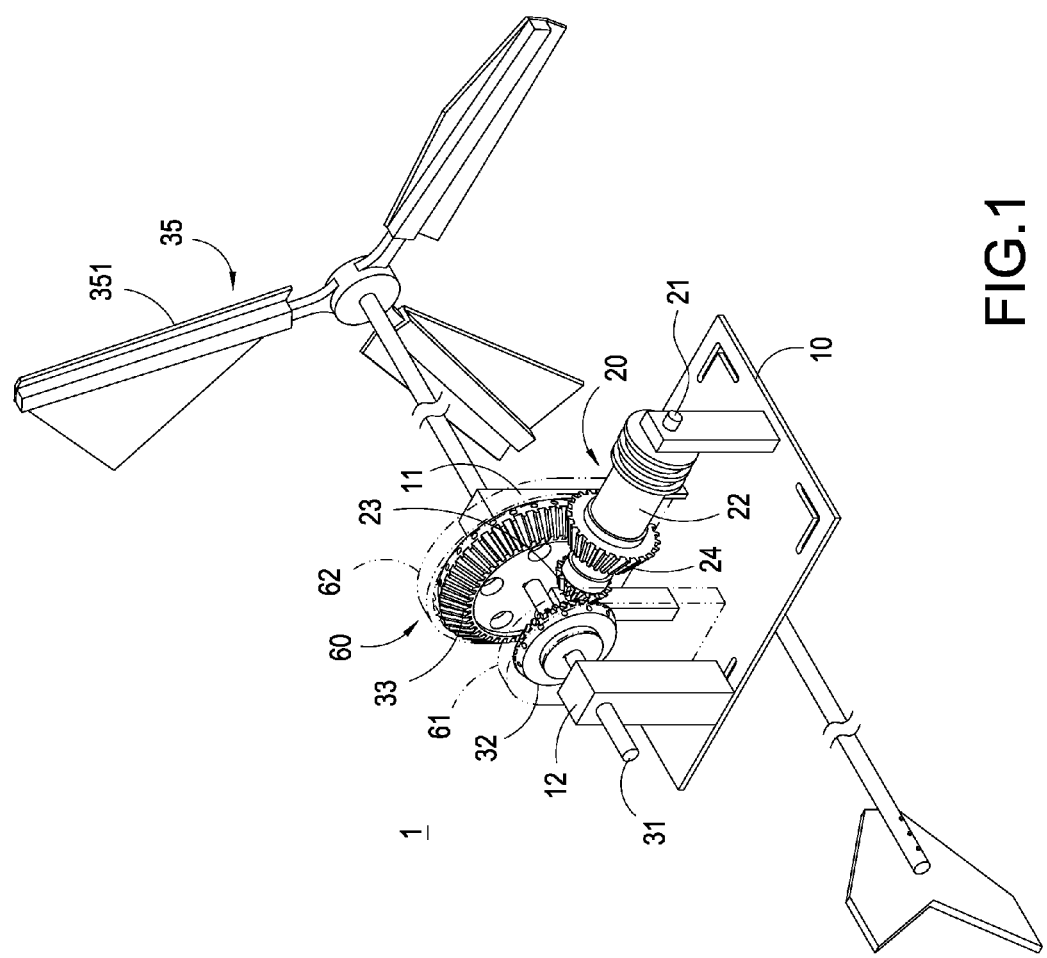
FIG. 1 is a schematic view of a first preferred embodiment of the present invention.

The technical contents of the present invention will become apparent with the detailed description of preferred embodiments accompanied with the illustration of related drawings as follows. It is noteworthy that same numerals are used for representing same respective elements in the drawings.

With reference to FIG. 1 for the schematic view of the first preferred embodiment of the present invention, the present invention provides a fluid power generating apparatus 1 that uses a fluid such as wind, water, or ocean current to generate electric power, and the fluid power generating apparatus 1 comprises a loading seat 10, a transmission mechanism 20, a power generating mechanism 30 and a generator 40.

Figure 2:
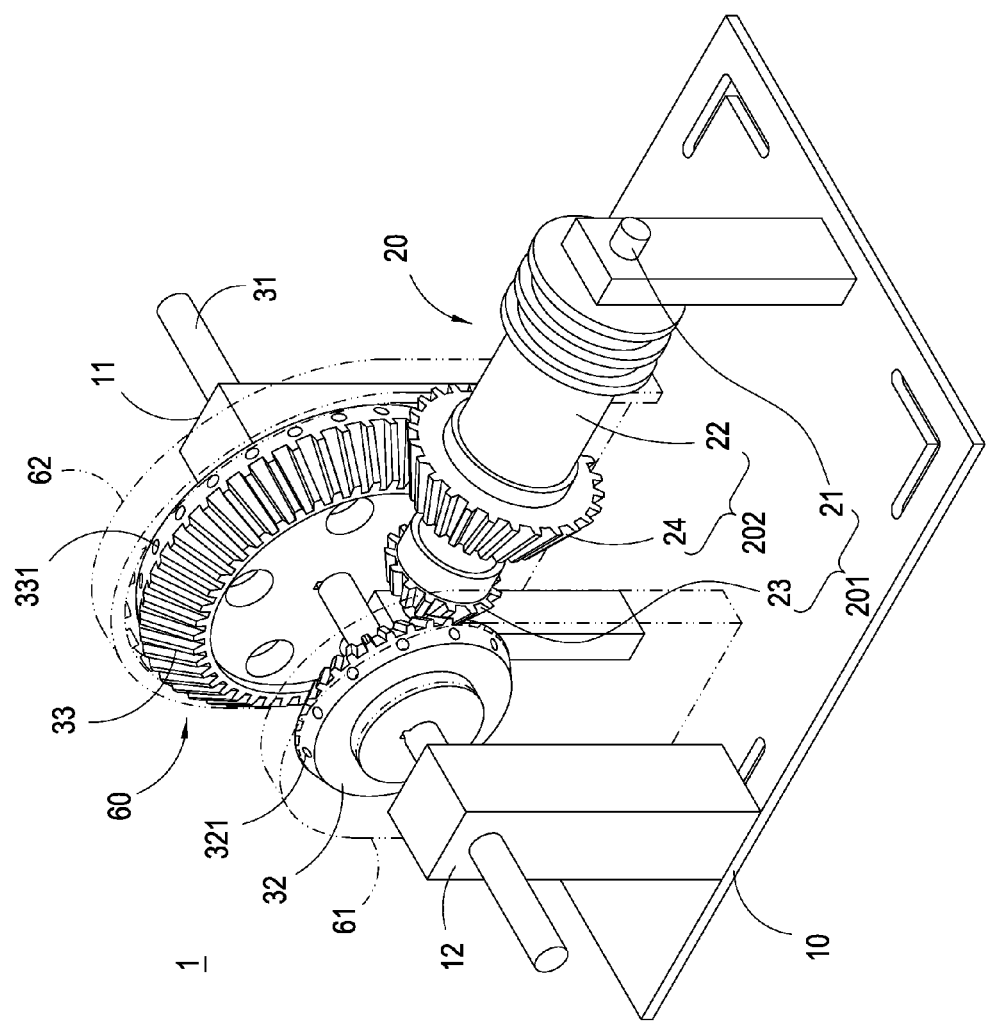
FIG. 2 is a perspective view of the first preferred embodiment of the present invention.
Figure 3:
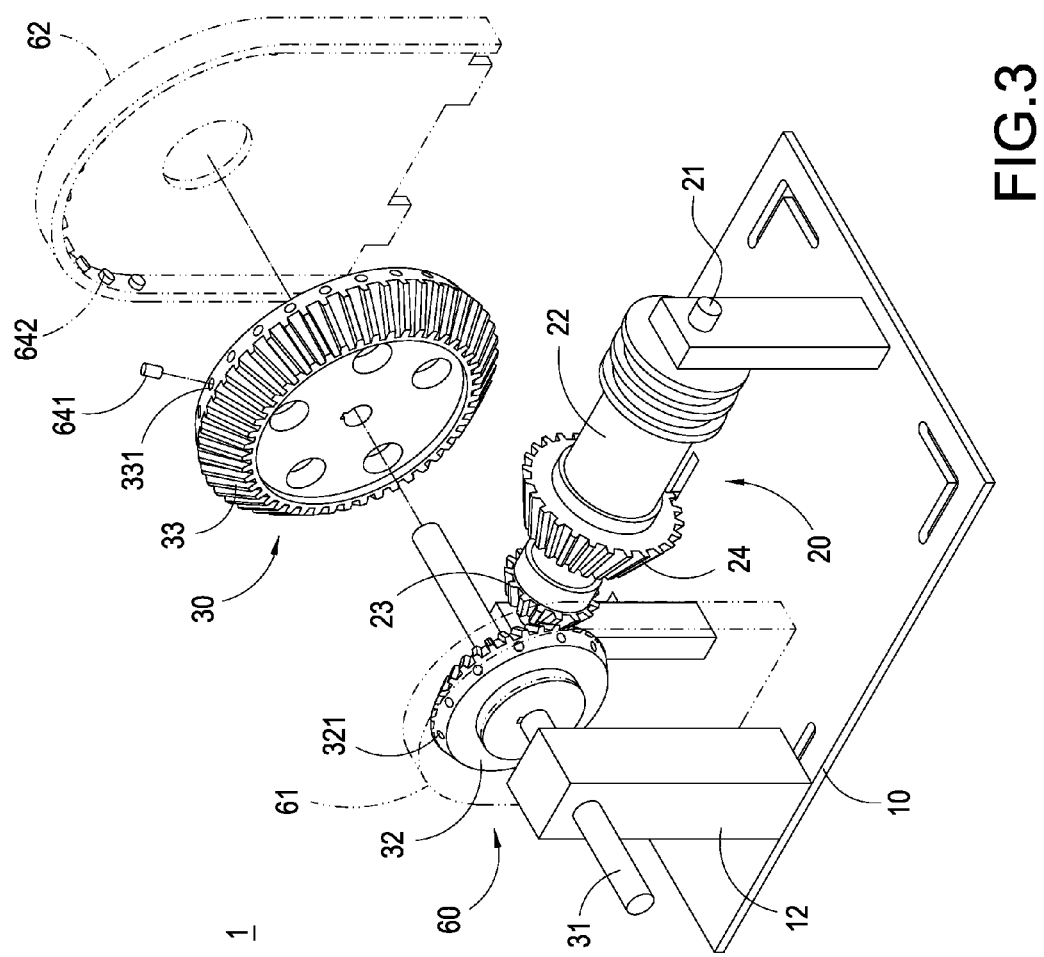
FIG. 3 is an exploded view of the first preferred embodiment of the present invention.

With reference to FIGS. 2 and 3 for the perspective view and exploded view of the preferred embodiment of the present invention respectively, the loading seat 10 includes a first support frame 11 and a second support frame 12.

Figure 4:
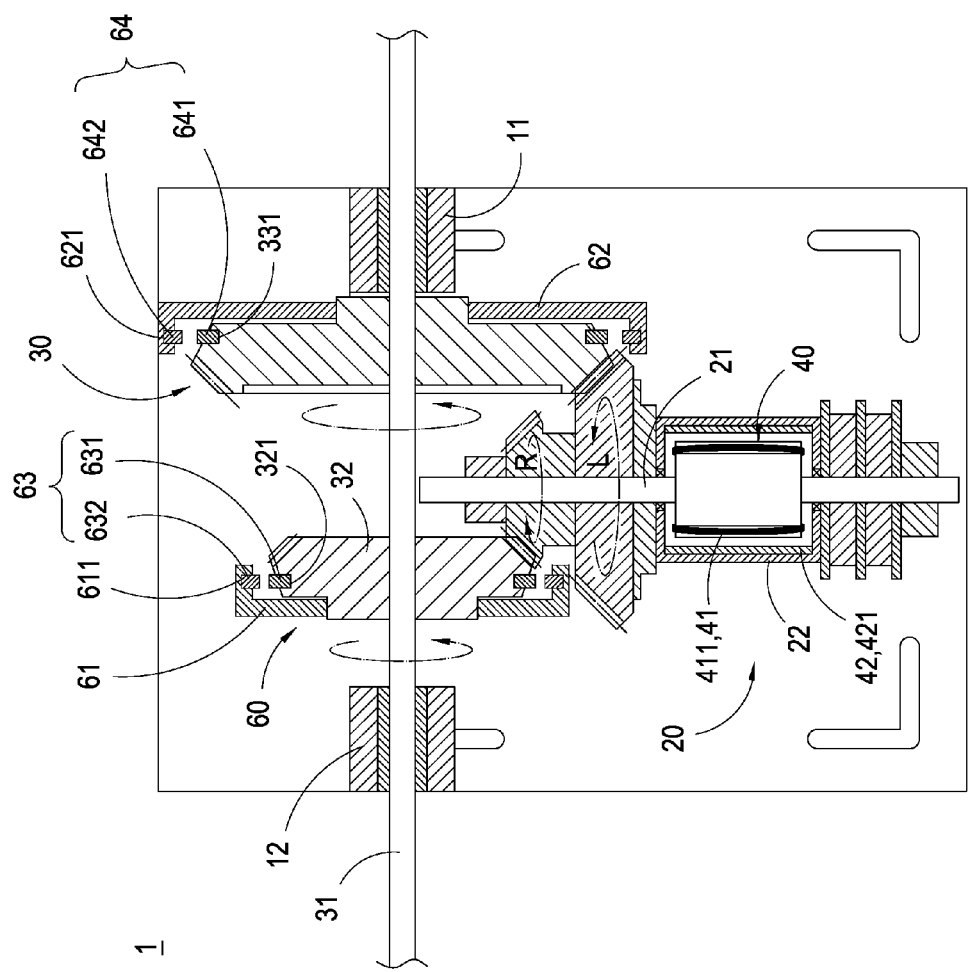
FIG. 4 is a first schematic view of a using status of the first preferred embodiment of the present invention.

The transmission mechanism 20 is mounted onto the loading seat 10 and configured corresponding to the power generating mechanism 30, and the transmission mechanism 20 includes a first transmission assembly 201 and a second transmission assembly 202, and the first transmission assembly 201 includes a driven shaft 21 (as shown in FIG. 4) and a first driven wheel 23; the second transmission assembly 202 includes a hollow body 22 and a second driven wheel 24; the hollow body 22 is sheathed on the exterior of the driven shaft 21, and an end of the driven shaft 21 is extended outwardly and passed out from the hollow body 22 to form a connecting section 211; and the first driven wheel 23 is fixed onto the connecting section 211, and the second driven wheel 24 is fixed to the exterior of the hollow body 22, and both first driven wheel 23 and second driven wheel 24 are bevel gears.

The power generating mechanism 30 includes a primary shaft 31, a first driving wheel 32 and a second driving wheel 33 and a fan 35, wherein both ends of the primary shaft 31 are coupled to the first support frame 11 and the second support frame 12 respectively, and the power generating mechanism 30 is disposed between the first support frame 11 and the second support frame 12; the first driving wheel 32, the second driving wheel 33 and the fan 35 are fixed to the primary shaft 31, and the first driving wheel 32 is engaged with the first driven wheel 23, and the second driving wheel 33 is engaged with the second driven wheel 24, so that when the primary shaft 31 rotates, the first driving wheel 32 drives the first driven wheel 23 to rotate, and the second driving wheel 33 drives the second driven wheel 24 to rotate, and the rotating direction of the driven shaft 21 is opposite to the rotating direction of the hollow body 22. In addition, the inner circumferential surface of the first driving wheel 32 has a plurality of through holes 321 formed thereon and arranged with an interval apart from one another, and the inner circumferential surface of the second driving wheel 33 also has a plurality of holes 331 formed thereon and arranged with an interval apart from one another, and both first driving wheel 32 and second driving wheel 33 are bevel gears.

The fan 35 is fixed to the primary shaft 31 and the fan 35 has a plurality of primary vanes 351 arranged with an interval apart from one another and around the primary shaft 31, so that each fan 35 is a reverse fan.

The generator 40 includes a primary rotor 41 and a secondary rotor 42 configured corresponding to the primary rotor 41, and the primary rotor 41 is fixed to the driven shaft 21 and rotated together with the driven shaft 21, and the secondary rotor 42 is fixed to the hollow body 22 and rotated together with the hollow body 22. The primary rotor 41 is comprised of a plurality of coils 411 fixed around the exterior of the driven shaft 21, and the secondary rotor 42 is comprised of a plurality of permanent magnets 421 fixed around the inner circumferential surface of the hollow body 22, and the permanent magnets 421 are magnets of opposite polarities and arranged alternately with each other.

Further, the fluid power generating apparatus 1 of the present invention further comprises a magnetic repulsion structure 60 installed between the first support frame 11 and the second support frame 12. The magnetic repulsion structure 60 includes a first circular frame 61, a second circular frame 62, a first magnetic assembly 63 and a second magnetic assembly 64, wherein the first circular frame 61 is disposed around the exterior of the first driving wheel 32, and the first circular frame 61 has a plurality of embedding holes 611 formed on the inner circumferential surface of the first circular frame 61 and arranged with an interval apart from one another; the second circular frame 62 is disposed around the exterior of the second driving wheel 33, and the second circular frame 62 has plurality of fixing holes 621 formed on the inner circumferential surface of the second circular frame 62 and arranged with an interval apart from one another; the first magnetic assembly 63 is installed between the first driving wheel 32 and the first circular frame 61; and the second magnetic assembly 64 is installed between the second driving wheel 33 and the second circular frame 62.

The first magnetic assembly 63 includes a plurality of primary magnetic units 631 and a plurality of secondary magnetic units 632, and each primary magnetic unit 631 is fixed into each corresponding through hole 321 of the first driving wheel 32, and each secondary magnetic unit 632 is fixed into each corresponding embedding hole 611 of the first circular frame 61; and each primary magnetic unit 631 and each secondary magnetic unit 632 are configured opposite to each other and have a same polarity.

The second magnetic assembly 64 includes a plurality of primary magnetic units 641 and a plurality of secondary magnetic units 642, and each primary magnetic unit 641 is fixed into each corresponding hole 331 of the second driving wheel 33, and each secondary magnetic unit 642 is fixed into each corresponding fixing hole 621 of the second circular frame 62; and each primary magnetic unit 641 and each secondary magnetic unit 642 are configured opposite to each other and have a same polarity.

Figure 5:
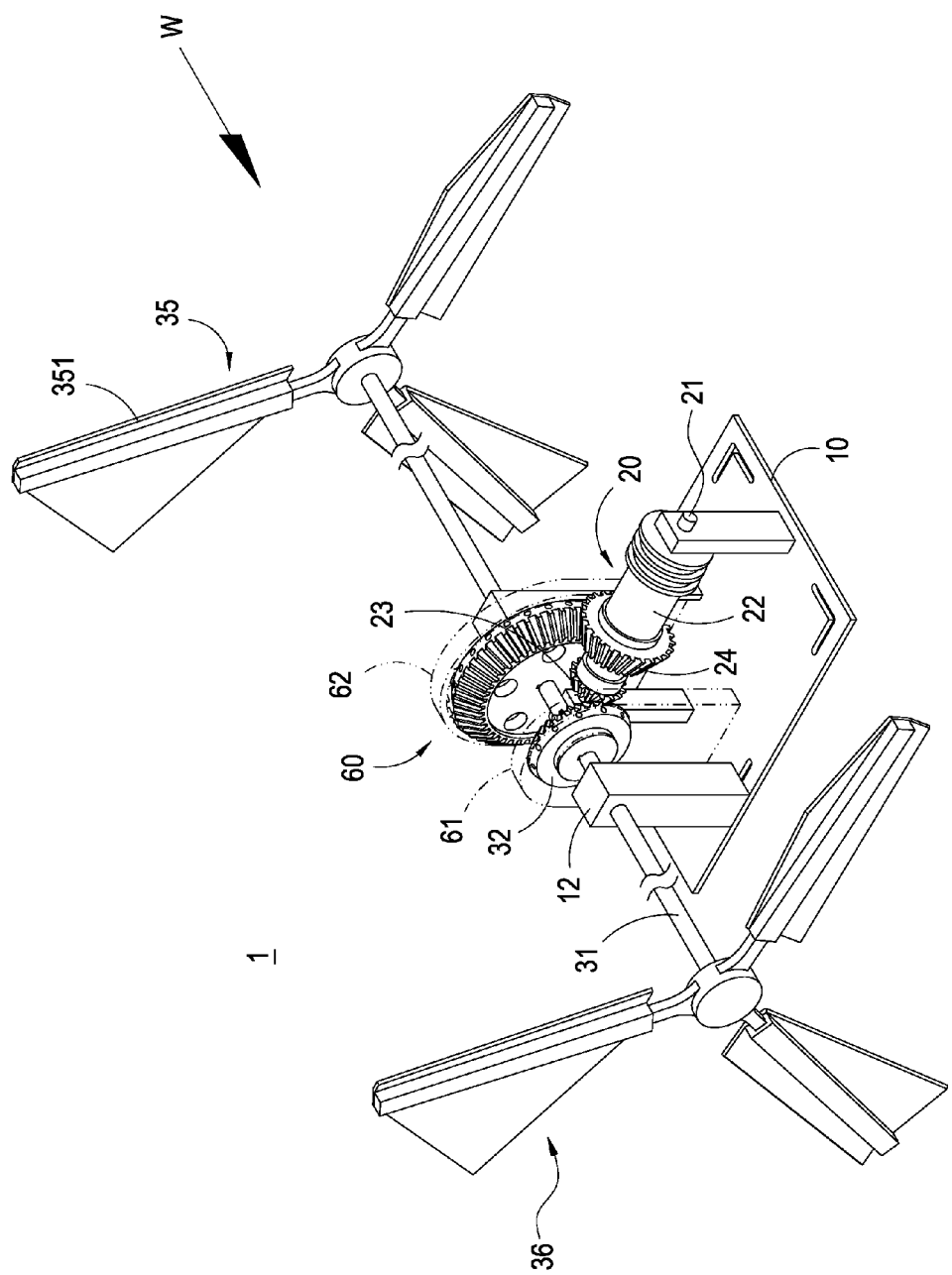
FIG. 5 is a second schematic view of a using status of the first preferred embodiment of the present invention.

With reference to FIGS. 4 and 5 for the first and second schematic views of the using status of the first preferred embodiment of the present invention respectively, the fluid power generating apparatus 1 is applied for fluids such as water or wind. When the power generating apparatus 1 is applied for generating power by a fluid such as water or wind, the fluid power generating apparatus 1 is driven by a wind force W, the fan 35 drives the primary shaft 31 to rotate in a second direction L to drive the first driving wheel 32 to rotate the first driven wheel 23 and the driven shaft 21 to rotate in a first direction R, and the second driving wheel 33 drives the second driven wheel 24 and the hollow body 22 to rotate in a second direction L; and the first direction R is a clockwise direction, and the second direction L is a counterclockwise direction.

The primary rotor 41 and the secondary rotor 42 are moved with respect to each other to generate current in each coil 411 of the primary rotor 41, so as to achieve the power generation effect.

Since the first driving wheel 32 drives the first driven wheel 23 to rotate in a first direction R, and the second driving wheel 33 drives the second driven wheel 24 to rotate in a second direction L, so as drive the secondary rotor 42 fixed to the hollow body 22 and the primary rotor 41 fixed to the driven shaft 21 to rotate in opposite directions, therefore the relative distance between the primary rotor 41 and the secondary rotor 42 resulted from the relative movement increases per unit time, so as to increase the relative speed of the primary rotor 41 and the secondary rotor 42 and the amount of current generated in the primary rotor 41, and improve the generation effect of the fluid power generating apparatus 1.

In addition, each primary magnetic unit 631 of the first magnetic assembly 63 and each secondary magnetic unit 632 of the first magnetic assembly 63 have a same polarity, and each secondary magnetic unit 641 of the second magnetic assembly 64 and each primary magnetic unit 642 of the second magnetic assembly 64 have a same polarity, so that when the first driving wheel 32 is rotated with respect to the first circular frame 61, the rotation torque occurs at the start is reduced due to the principle of magnetic repulsion of each primary magnetic unit 631 of the first magnetic assembly 63 and each secondary magnetic unit 632 of the first magnetic assembly 63. Similarly, when the second driving wheel starts rotating and during the rotation process, the rotation torque of the start is reduced due to the principle of magnetic repulsion of each primary magnetic unit 641 of the second magnetic assembly 64 and each secondary magnetic unit 642 of the second magnetic assembly 64.

Figure 6:
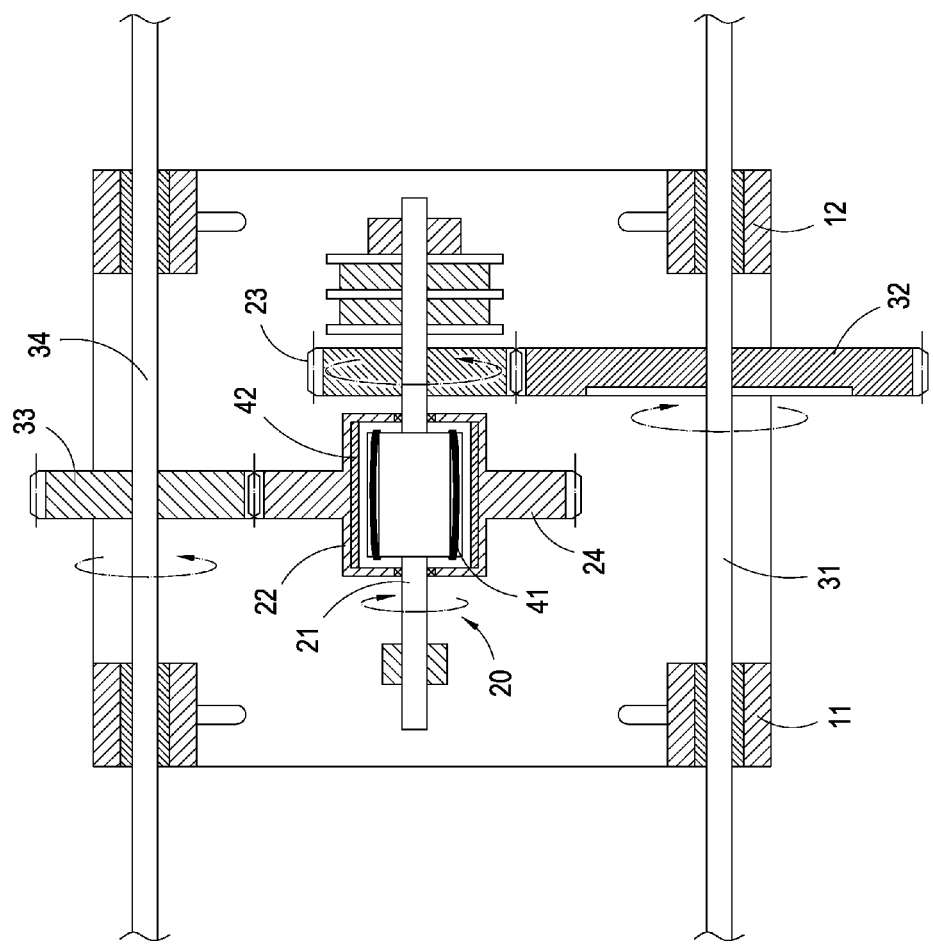
FIG. 6 is a schematic view of a using status of a second preferred embodiment of the present invention.

With reference to FIG. 6 for the schematic view of the using status of the second preferred embodiment of the present invention, the difference of this preferred embodiment from the first preferred embodiment resides on that the power generating mechanism 30 further comprises at least one secondary fan 36 and a secondary shaft 34.

The first driving wheel 32 is fixed to the primary shaft 31, and the second driving wheel 33 is fixed to the secondary shaft 34, and both ends of the primary shaft 31 and the secondary shaft 34 are coupled to the first support frame 11 and the second support frame 12 respectively. The fan 35 is fixed to the primary shaft 31, and the secondary fan 36 is fixed to the secondary shaft 34, wherein the fan 35 is a forward fan, and the secondary fan 36 is a reverse fan. In addition, the first driven wheel 23, second driven wheel 24, first driving wheel 32 and second driving wheel 33 are forward gears.

When the fan 35 and the secondary fan 36 are driven by a wind force W, the fan 35 drives the primary shaft 31 to rotate in a first direction R, so that the first driving wheel 32 drives the first driven wheel 23 and the driven shaft 21 to rotate in the first direction R. Meanwhile, the secondary fan 36 drives the secondary shaft 34 to rotate in a second direction L, and the second driving wheel 33 drives the second driven wheel 24 and the hollow body 22 to rotate in the second direction, wherein the first direction R is a clockwise direction, and the second direction L is a counterclockwise. Therefore, the primary rotor 41 fixed to the driven shaft 21 and the secondary rotor 42 fixed to the hollow body 22 are rotated in opposite directions with respect to each other, so as to achieve the effect of improving the generating capacity of the fluid power generating apparatus 1.

Figure 7:
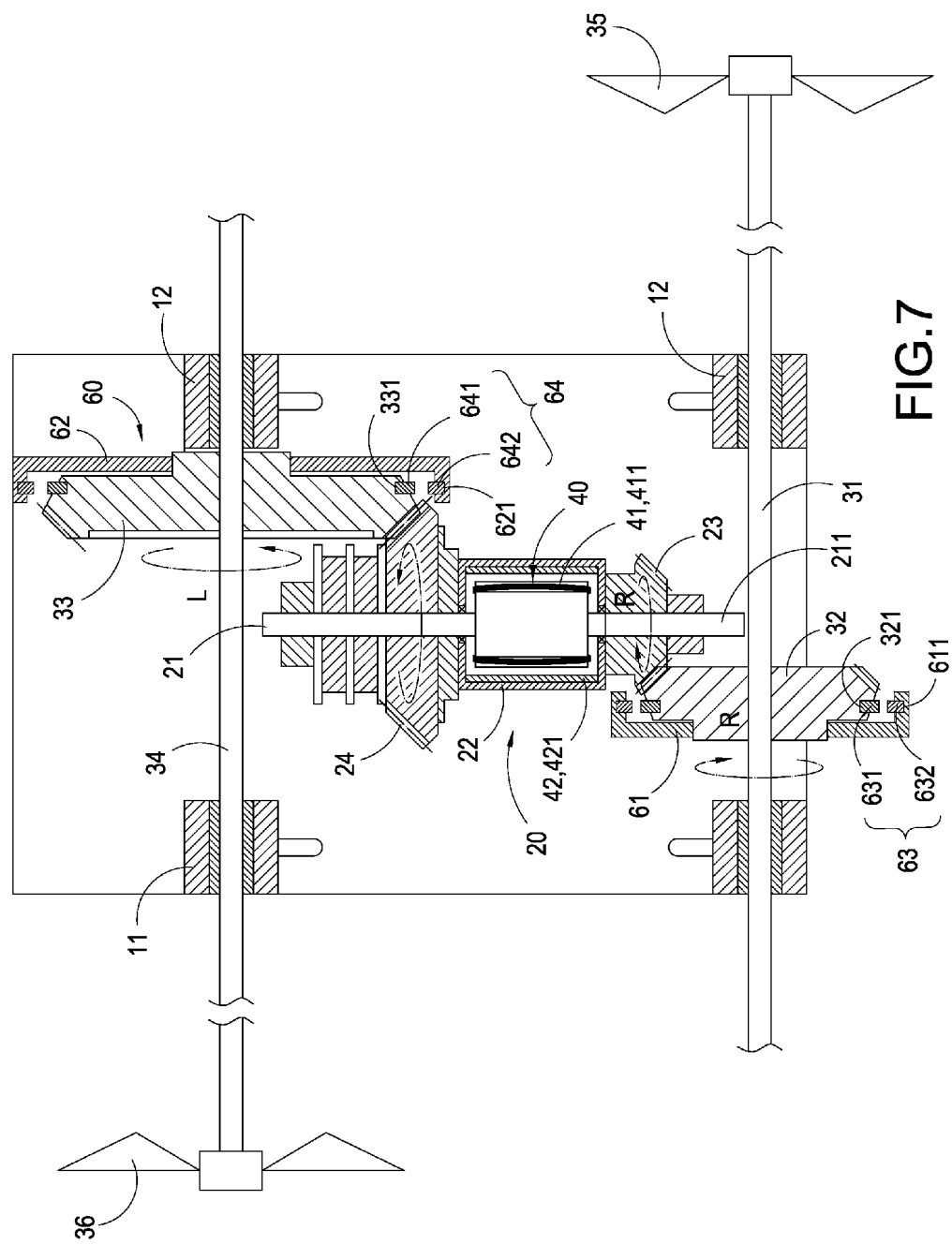
FIG. 7 is a schematic view of a using status of a third preferred embodiment of the present invention.

With reference to FIG. 7 for the schematic view of the using status of the third preferred embodiment of the present invention, the difference of this preferred embodiment from the aforementioned preferred embodiments resides on that the first circular frame 61 may be disposed around the exterior of the first driving wheel 32 that is fixed to the primary shaft 31, and the second circular frame 62 may be disposed around the exterior of the second driving wheel 33 that is fixed to the secondary shaft 34, and the first magnetic assembly 63 may be installed between the first driving wheel 32 and the first circular frame 61, and the second magnetic assembly 64 may be installed between the second driving wheel 33 and the second circular frame 62, so that the repulsion of each first magnetic unit 631, 641 and each second magnetic unit 632, 642 of the first magnetic assembly 63 and the second magnetic assembly 64 can be used for reducing the rotation torque at the start.

Figure 8:
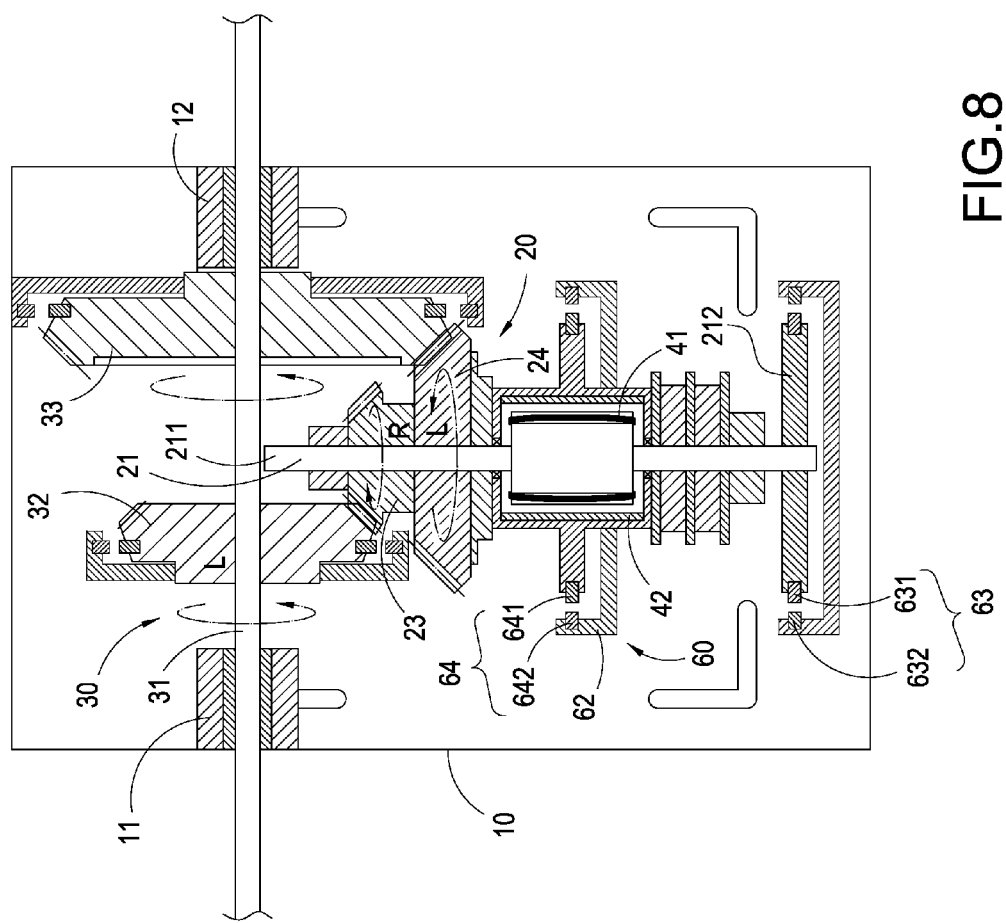
FIG. 8 is a schematic view of a using status of a fourth preferred embodiment of the present invention.

With reference to FIG. 8 for the schematic view of the using status of the fourth preferred embodiment of the present invention, the difference of this preferred embodiment from the aforementioned preferred embodiments resides on that a circular disc 212 may be connected to an end of the driven shaft 21 that is away from the connecting section 211, and the first circular frame 61 may be installed around the exterior of the circular disc 212, and the second circular frame 62 may be installed around the exterior of the hollow body 22, and the first magnetic assembly 63 may be installed between the circular disc 212 and the first circular frame 61, and the second magnetic assembly 64 may be installed between the hollow body 22 and the second circular frame 62.

The first magnetic assembly 63 includes a plurality of primary magnetic units 631 fixed to the inner circumferential surface of the circular disc 212 and a plurality of secondary magnetic units 632 fixed to the inner circumferential surface of the first circular frame 61, and each primary magnetic unit 631 and each secondary magnetic unit 632 are configured corresponding to each other and have a same polarity.

The second magnetic assembly 64 includes a plurality of primary magnetic units 641 fixed to the inner circumferential surface of the hollow body 22 and a plurality of secondary magnetic units 642 fixed to the inner circumferential surface of the second circular frame 62, and each primary magnetic unit 641 and each secondary magnetic unit 642 are configured corresponding to each other and have a same polarity. Therefore, the repulsion force between each primary magnetic unit 641 and each secondary magnetic unit 642 can be used for reducing the rotation torque at the start.

Figure 9:
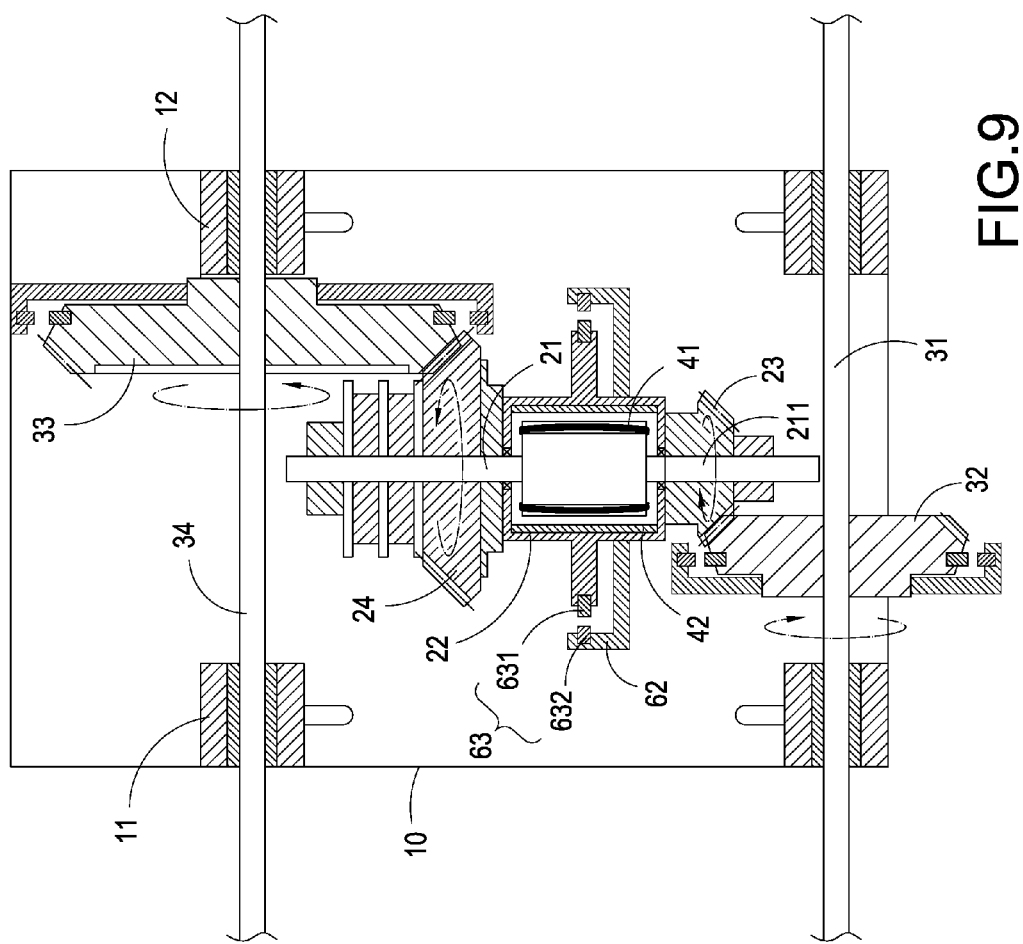
FIG. 9 is a schematic view of a using status of a fifth preferred embodiment of the present invention.

With reference to FIG. 9 for the schematic view of the using status of the fifth preferred embodiment of the present invention, the difference of this preferred embodiment from the aforementioned preferred embodiments resides on that a second circular frame 62 may be installed around the exterior of the hollow body 22, but the first circular frame 61 is not installed around the exterior of the driven shaft 21, and a second magnetic assembly 64 may be installed between the hollow body 22 and the second circular frame 62, but the first magnetic assembly 63 is not installed between the driven shaft 21 and the first circular frame 61, and thus the aforementioned structure can reduce the rotation torque at the start.

Figure 10:
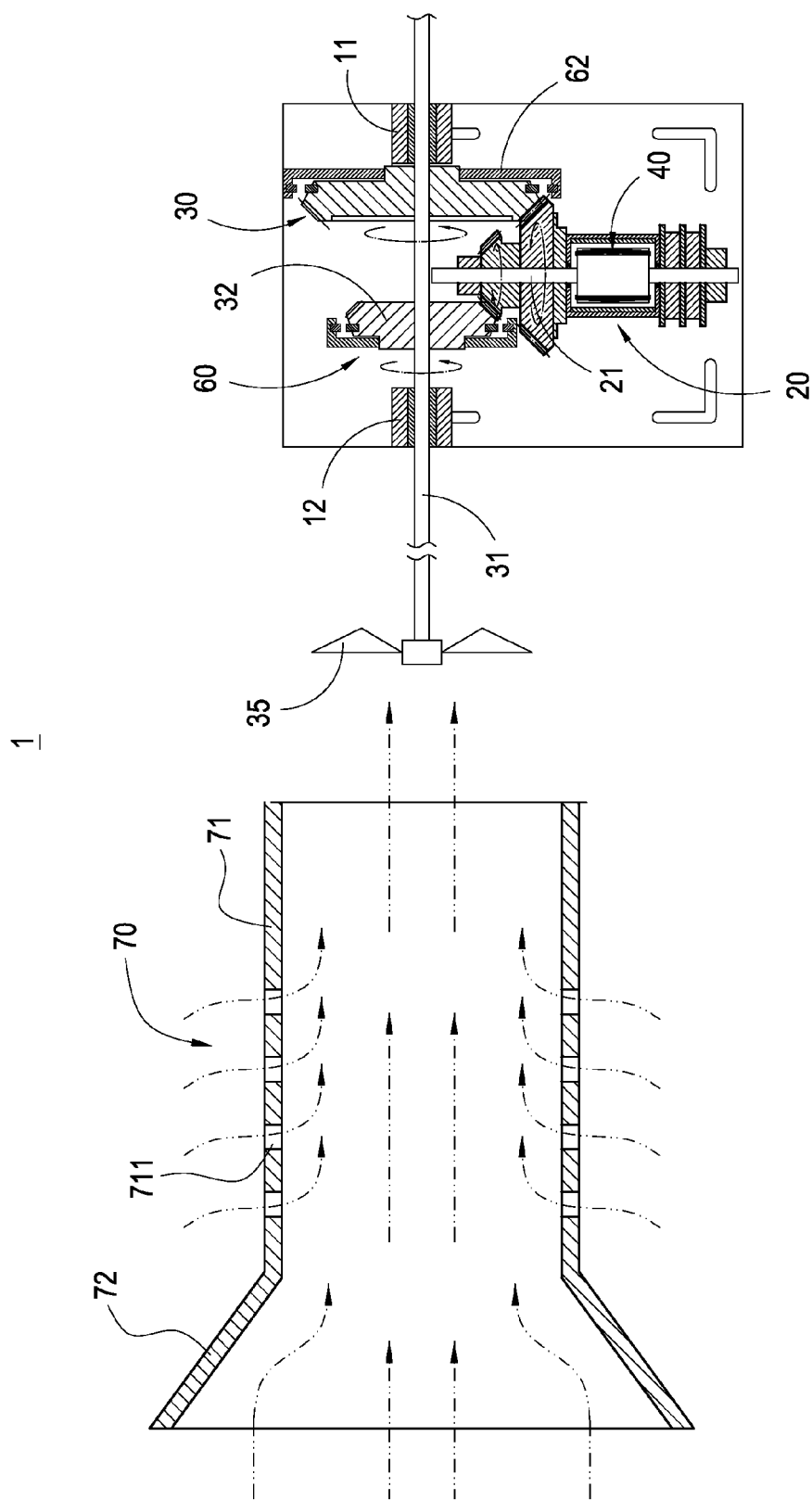
FIG. 10 is a schematic view of a using status of a sixth preferred embodiment of the present invention.

With reference to FIG. 10 for the schematic view of the using status of the sixth preferred embodiment of the present invention, the difference of this preferred embodiment from the aforementioned preferred embodiments resides on that this preferred embodiment further comprises a wind collection hood 70 installed at the front of the fan 35, and the wind collection hood 70 is formed by a circular straight pipe section 71 and a funnel wind inlet section 72 coupled to a distal portion of the straight pipe section 71, and the straight pipe section 71 has a plurality of penetrating holes 711 formed thereon, such that when a fluid enters from the wind inlet section 72 into the wind collection hood 70, the fluid is compressed to increase the speed before it flows into the straight pipe section 71, so that the external fluid can enter from each penetrating hole 711 into the straight pipe section 71 to increase the output amount of the fluid, so as to increase the rotation speed of the fan 35.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A fluid power generating apparatus, comprising:
a loading seat;
a power generating mechanism, mounted onto the loading seat, and including a primary shaft, a first driving wheel, a second driving wheel and a fan, and the fan, the first driving wheel and the second driving wheel being connected to the primary shaft to rotate simultaneously, wherein the first driving wheel and the second driving wheel are coaxially disposed on the primary shaft with the same rotational direction and are parallel to each other;
a transmission mechanism, mounted on the loading seat and configured corresponding to the power generating mechanism, and including a first transmission assembly and a second transmission assembly, and the first transmission assembly including a driven shaft and a first driven wheel connected to the driven shaft, the driven shaft being perpendicular to the primary shaft and being disposed between the first driving wheel and the second driving wheel, the first driven wheel and the driven shaft being driven by the first driving wheel to rotate, and the second transmission assembly including a hollow body connected to the driven shaft and a second driven wheel connected to the hollow body and driven by the second driving wheel to rotate, and the rotating direction of the driven shaft being opposite to the rotating direction of the hollow body, wherein the first driven wheel is directly engaged with the first driving wheel, and the second driven wheel is directly engaged with the second driving wheel, wherein the first driving wheel, the second driving wheel, the first driven wheel, and the second driven wheel are all bevel gears; and
a generator, including a primary rotor and a secondary rotor configured corresponding to the primary rotor, and the primary rotor being connected to the driven shaft and rotating together with the driven shaft, and the secondary rotor being connected to the hollow body and rotating together with the hollow body.

2. The fluid power generating apparatus of claim 1, wherein the loading seat includes a first support frame and a second support frame with an interval apart from each other, and both ends of the primary shaft are passed and connected to the first support frame and the second support frame respectively.

3. The fluid power generating apparatus of claim 1, further comprising a magnetic repulsion structure, and the driven shaft being coupled to a circular disc, and the magnetic repulsion structure including a first circular frame disposed around the exterior of the circular disc and a first magnetic assembly installed between the circular disc and the first circular frame, and the first magnetic assembly including a plurality of primary magnetic units fixed to the outer circumferential surface of the circular disc and a plurality of secondary magnetic units fixed to the inner circumferential surface of the first circular frame, and the primary magnetic unit and the secondary magnetic unit being disposed opposite to each other and having a same polarity.

4. The fluid power generating apparatus of claim 1, further comprising a magnetic repulsion structure, and the magnetic repulsion structure including a second circular frame disposed around the exterior of the hollow body and a second magnetic assembly installed between the hollow body and the second circular frame, and the second magnetic assembly including a plurality of primary magnetic units fixed to the outer circumferential surface of the hollow body and a plurality of secondary magnetic units fixed to the inner circumferential surface of the second circular frame, and the primary magnetic units and the secondary magnetic units being configured opposite to each other and having a same magnetic pole.

5. The fluid power generating apparatus of claim 1, wherein the primary rotor includes a plurality of coils disposed at the periphery of the driven shaft, and the secondary rotor is comprised of a plurality of permanent magnets fixed onto the outer circumferential surface of the hollow body, and the permanent magnets are magnets of opposite polarities.

6. The fluid power generating apparatus of claim 1, further comprising a wind collection hood installed at the front of the fan.

7. The fluid power generating apparatus of claim 6, wherein the wind collection hood includes a circular straight pipe section and a funnel wind inlet section coupled to a distal portion of the straight pipe section.

8. The fluid power generating apparatus of claim 6, wherein the straight pipe section has a plurality of penetrating holes formed thereon.

9. A fluid power generating apparatus, comprising:
a loading seat;
a power generating mechanism, mounted onto the loading seat, and including a primary shaft, a first driving wheel, a second driving wheel and a fan, and the fan, the first driving wheel and the second driving wheel being connected to the primary shaft to rotate simultaneously;

a transmission mechanism, mounted on the loading seat and configured corresponding to the power generating mechanism, and including a first transmission assembly and a second transmission assembly, and the first transmission assembly including a driven shaft and a first driven wheel connected to the driven shaft, and driven by the first driving wheel to rotate, and the second transmission assembly including a hollow body connected to the driven shaft and a second driven wheel connected to the hollow body and driven by the second driving wheel to rotate, and the rotating direction of the driven shaft being opposite to the rotating direction of the hollow body; and a generator, including a primary rotor and a secondary rotor configured corresponding to the primary rotor, and the primary rotor being connected to the driven shaft and rotating together with the driven shaft, and the secondary rotor being connected to the hollow body and rotating together with the hollow body, wherein the loading seat includes a first support frame and a second support frame with an interval apart from each other, and both ends of the primary shaft are passed and connected to the first support frame and the second support frame respectively, and wherein a magnetic repulsion structure is installed between the first support frame and the second support frame, and the magnetic repulsion structure includes a first circular frame disposed around the exterior of the first driving wheel, a second circular frame is disposed around the exterior of the second driving wheel, a first magnetic assembly is installed between the first driving wheel and the first circular frame, and a second magnetic assembly is installed between the second driving wheel and the second circular frame.

10. The fluid power generating apparatus of claim 9, wherein the first driving wheel has a plurality of through holes formed on the outer circumferential surface of the first driving wheel and arranged with an interval apart from one another, and the first circular frame has a plurality of embedding holes formed on the inner circumferential surface of the first circular frame and arranged with an interval apart from one another, and the first magnetic assembly has a plurality of primary magnetic units fixed into the through holes respectively and a plurality of secondary magnetic units fixed into the embedding holes respectively, and the primary magnetic units and the secondary magnetic units are configured opposite to each other and have a same magnetic pole.

11. The fluid power generating apparatus of claim 9, wherein the second driving wheel has a plurality of holes formed on the outer circumferential surface of the second driving wheel and arranged with an interval apart from one another, and the second circular frame has a plurality of fixing holes formed on the inner circumferential surface of the second circular frame and arranged with an interval apart from one another, and the second magnetic assembly includes a plurality of primary magnetic units fixed into the holes respectively, and a plurality of secondary magnetic units fixed into the fixing holes respectively, and the primary magnetic unit and the secondary magnetic unit are configured opposite to each other and have a same magnetic pole.

* * * * *